United States Patent [19]

Kiso et al.

[11] Patent Number: 5,855,333
[45] Date of Patent: Jan. 5, 1999

[54] TAPE CARTRIDGE

[75] Inventors: Hiroyuki Kiso; Masanori Abe, both of Miyagi, Japan

[73] Assignee: Sony Corporation, Japan

[21] Appl. No.: 801,461

[22] Filed: Feb. 18, 1997

[30] Foreign Application Priority Data

Feb. 26, 1996 [JP] Japan .................................. 8-038395

[51] Int. Cl.$^6$ ................................................ G11B 23/087
[52] U.S. Cl. .......................................... 242/344; 242/347
[58] Field of Search ........................... 360/132; 242/344, 242/347

[56] References Cited

U.S. PATENT DOCUMENTS

| | | | |
|---|---|---|---|
| 4,858,848 | 8/1989 | Katoku et al. ........................... | 242/344 |
| 4,965,690 | 10/1990 | Tanaka et al. ........................... | 242/347 |
| 5,468,065 | 11/1995 | Ishikawa ................................. | 242/347 |
| 5,627,706 | 5/1997 | Ishikawa ................................. | 242/347 |
| 5,638,239 | 6/1997 | Ohgi ....................................... | 360/132 |
| 5,649,673 | 7/1997 | Ishikawa ................................. | 242/347 |

*Primary Examiner*—John P. Darling
*Attorney, Agent, or Firm*—Ronald P. Kananen

[57] ABSTRACT

A tape cartridge in which it is possible to suppress warping otherwise produced in a lower cartridge half in its entirety on insert molding a meal plate on the lower cartridge half. A reel lock unit 21 having a reel lock member 37 and a mistaken recording inhibiting member 39 is mounted on a backside outer peripheral wall section 16. Formed adjacent to the corners intermediate between the reel lock unit 21 and the corners are cut-outs 16C, 16D in the outer peripheral wall section 16. The cut-outs 16C, 16D are of cut-out depths coincident with the boundary line of a label area L bonded on the backside of the main cartridge body portion 2.

3 Claims, 6 Drawing Sheets

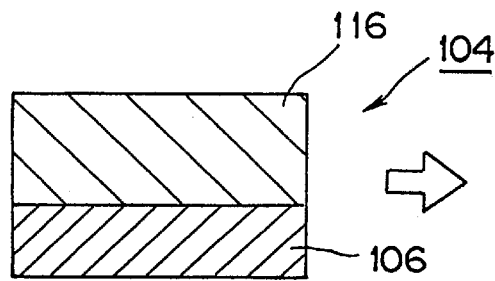
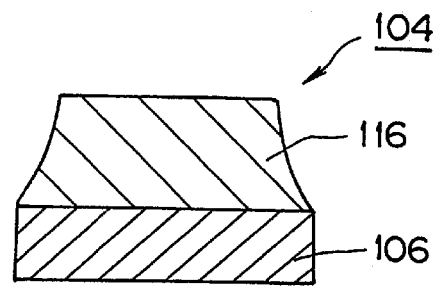
FIG.1A
PRIOR ART
FIG.1B
PRIOR ART
FIG.2A
PRIOR ART
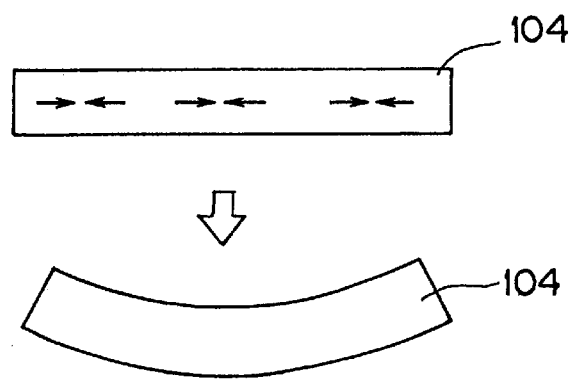
FIG.2B
PRIOR ART

TAPE CARTRIDGE

BACKGROUND OF THE INVENTION

1. Field of the Invention

This invention relates to a tape cartridge in which a pair of tape reels each having wound thereon a tape-shaped medium such as a magnetic tape are housed within the inside of a man cartridge body portion and in which a metallic plate is insert-molded on a lower cartridge half constituting the main cartridge body portion.

2. Description of the Related Art

In general, in a conventional tape cartridge for a video tape recorder or DAT, a main cartridge body portion is formed by a lower cartridge half and an upper cartridge half each in the form of a shallow rectangular saucer opened on its front side. Within this main cartridge body portion are rotatably housed a pair of tape reels having wound thereon a magnetic tape, while a loading spacing is defined on the open front side. When the tape cartridge is loaded on a loading unit of a recording/reproducing apparatus, tape loading means provided on the recording/reproducing apparatus is intruded into this loading spacing. This loading spacing is opened or closed by a lid rotatably supported by the main cartridge body portion.

Meanwhile, such tape cartridge is known in which a metallic base plate is insert-molded in unison on a bottom surface of a lower cartridge half constituting the main cartridge body portion. This tape cartridge, having the base plate, is improved in mechanical strength against warping or torsion, while being increased in overall weight. If vibrations of a tape driving mechanism driving tape reels are applied to the tape cartridge, there is no risk of the tape cartridge being oscillated to affect the running of the magnetic tape, thus assuring high-precision recording/reproduction of information signals.

In a lower cartridge half 104, making up the tape cartridge, shown in FIG. 1A, a base plate 106 may be deemed to be substantially rigid with respect to a resin material when the lower cartridge half is thermally contracted following injection molding, so that the amount of contraction of the portion of a resin part 116 neighboring to the base plate 106 is substantially zero. On the other hand, the portion of the resin part 116 remote from the base plate 106 is contracted significantly, on thermal contraction following injection molding, as compared to the portion thereof neighboring the base plate 106.

That is, when the base plate 106 is insert-molded on the lower cartridge half 104, the portion of the lower cartridge half neighboring to the base plate 106 undergoes only small contraction, while the portion thereof remote from the base plate 106 undergoes significant contraction. The result is that the lower cartridge half 104 is subjected to tension in the longitudinal direction of the outer peripheral wall section due to such differential contraction as indicated by arrow in FIG. 2A. Thus the lower cartridge half 104 undergoes warping in its entirety as indicated in FIG. 2B. Such warping in the entire cartridge half is produced significantly in particular in the longitudinal direction of the lower cartridge half 104.

SUMMARY OF THE INVENTION

It is therefore an object of the present invention to provide a tape cartridge whereby warping produced in the entire lower cartridge half on insert-molding a metallic plate on the lower cartridge half may be suppressed significantly.

In a tape cartridge according to the present invention, a plurality of mounting areas in which to mount functional members are formed adjacent to the outer peripheral wall section formed upright on the lower cartridge half and a cut-out having a cut-out depth coincident with the boundary line of a bonding area for a display label is provided adjacent to a corner and between these mounting areas. The display label is bonded to the backside of the main cartridge body portion. By this structure, the lower cartridge half may be prevented from being warped as a result of thermal contraction following injection molding off the lower cartridge half.

Preferably, the metal plate is insert-molded so that its lateral edge is exposed at a lateral surface of the cartridge main body portion, while a cut-out in register at least with a lateral edge of the metal plate is formed on the outer peripheral wall section formed upright on the lower cartridge half. By this structure, the lower cartridge half may similarly be prevented from being warped as a result of thermal contraction following injection molding off the lower cartridge half.

Preferably, a plurality of mounting areas in which to mount functional members are formed adjacent to the outer peripheral wall section formed upright on the lower cartridge half, while a cut-out having a cut-out depth coincident with the boundary line of a bonding area for a display label is provided between the mounting areas, with the display label being bonded to the backside of the main cartridge body portion. Also preferably, a cut-out in register at least with a lateral edge of the metal plate is formed on the outer peripheral wall section formed upright on the lower cartridge half.

By this structure, the lower cartridge half may likewise be prevented from being warped as a result of thermal contraction following injection molding of the lower cartridge half.

With the above-described tape cartridge, in which the cut-outs are formed in the outer peripheral backside wall section formed upright on the lower cartridge half, the differential thermal contraction between the portion of the outer peripheral backside wall section adjacent to the metal. plate and that remote from the metal plate is reduced, while the force of tension generated over the outer peripheral backside wall section to produce warping on the lower cartridge half in its entirety is fractionated, thus suppressing the warping generated in the lower cartridge half in its entirety.

Also, with the above-described tape cartridge, in which the cut-outs are formed in the lateral peripheral backside wall section formed upright on the lower cartridge half, the differential thermal contraction between the portion of the lateral peripheral backside wall section adjacent to the metal. plate and that remote from the metal plate is reduced, while the force of tension generated over the lateral peripheral backside wall section to produce warping on the lower cartridge half in its entirety is fractionated, thus suppressing the warping generated in the lower cartridge half in its entirety.

In addition, with the above-described tape cartridge, in which the cut-outs are formed in the outer and lateral peripheral backside wall section formed upright on the lower cartridge half, the differential thermal contraction between the portion of the peripheral backside wall section adjacent to the metal. plate and that remote from the metal plate is reduced, while the force of tension generated over the peripheral backside wall section to produce warping on the lower cartridge half in its entirety is fractionated, thus suppressing the warping generated in the lower cartridge half in its entirety.

BRIEF DESCRIPTION OF THE DRAWINGS

FIGS. 1A and 1B are cross-sectional views for illustrating a lower cartridge half constituting a conventional tape cartridge.

FIGS. 2A and 2B are side views for illustrating a lower cartridge half constituting a conventional tape cartridge.

DESCRIPTION OF THE PREFERRED EMBODIMENTS

Figure 3:
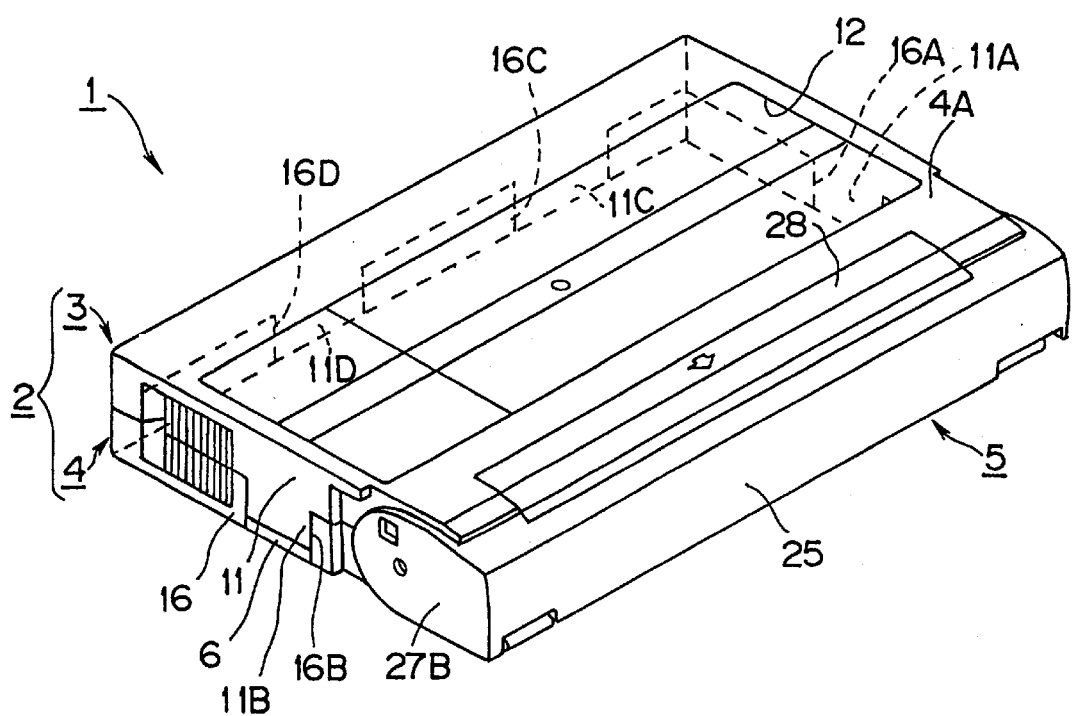
FIG. 3 is a perspective view showing a tape cartridge embodying the present invention.

Referring to the drawings, preferred embodiments of the present invention will be explained in detail.

Figure 4:
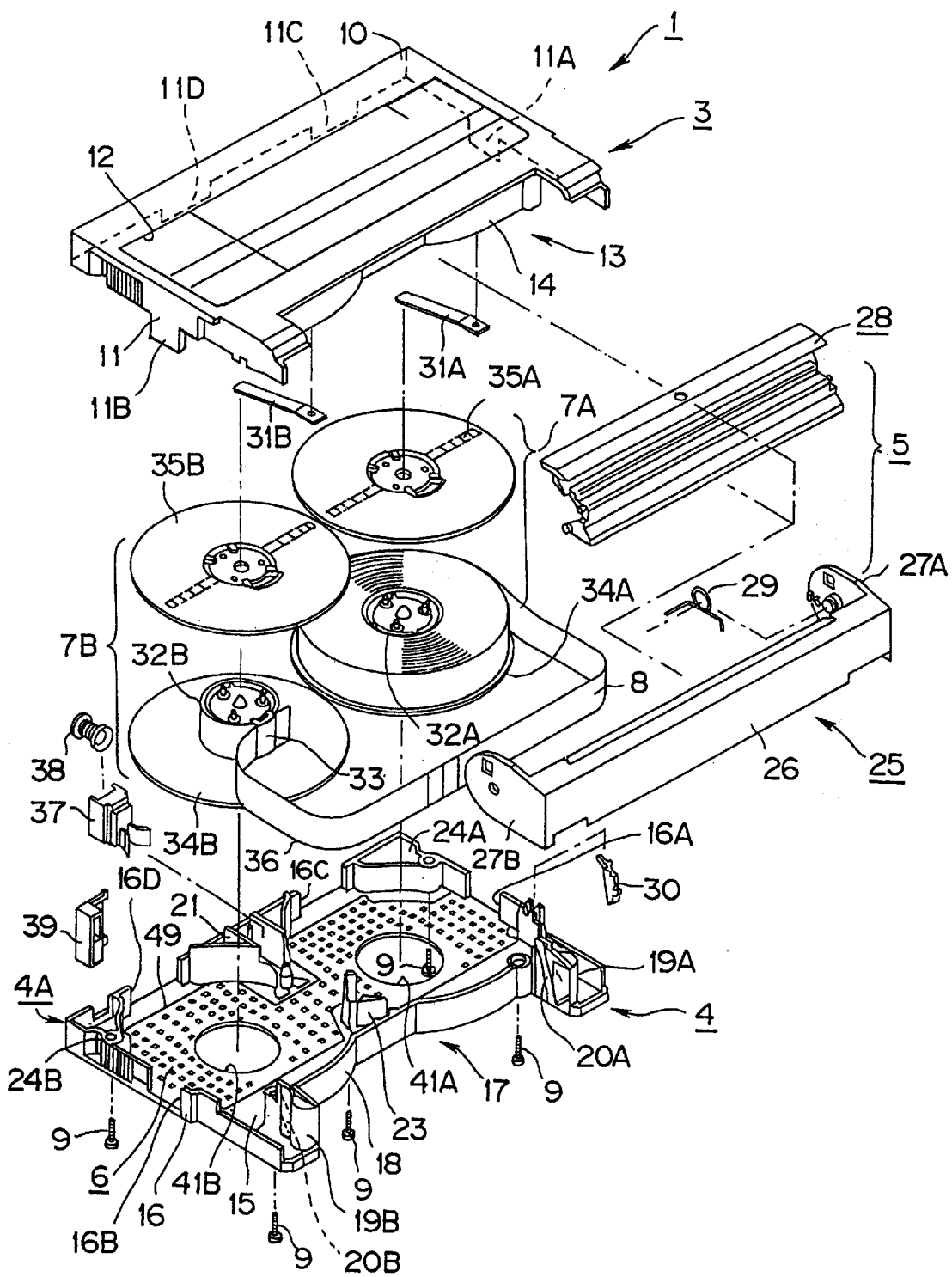
FIG. 4 is an exploded perspective view showing the tape cartridge of FIG. 1.

An 8 mm video tape cartridge 1 (tape cartridge 1) for a video tape recorder shown as a preferred embodiment of the present invention in FIGS. 3 through to 10, has a main cartridge body portion 2 combined from an upper cartridge half 3 of synthetic resin and a lower cartridge half 4 of synthetic resin on which a base plate 6 as later explained is insert-molded as one with the lower cartridge half 3, as shown in FIGS. 3 and 4. A lid structure 5 is rotatably mounted on the front side of the main cartridge body portion 2.

Within the main cartridge body portion 2 are rotatably mounted a pair of tape reels 7 (7A, 7B) about which is wound an 8 mm magnetic tape 8.

The upper cartridge half 3 is molded from a synthetic resin material, such as a polycarbonate resin and ABS resin, in the shape of a shallow saucer made up of a rectangular major surface wall section 10 and an outer peripheral wall section 11 formed upright on the outer periphery of the wall section 10 except a front side. The major surface wall section 10 is formed with a reel window 12. The reel window 12 is formed of a polycarbonate resin as a transparent portion and permits the state of winding of the magnetic tape 8 on the tape reels 7 to be checked visually from outside, while inhibiting intrusion of dust and dirt into the inside of the main cartridge body portion 2.

On the inner surface of the major surface wall section 10 is set upright a guide wall section 14 inwardly of the opened front side 13. The guide wall section 14 is an arcuately-shaped wall section bent from a mid portion towards both sides and constitutes a reel guide wall holding the outer periphery of the tape reels 7. Although not shown, a plurality of studs are provided on the inner surface of the major surface wall section 10 for securing the upper cartridge half 3 to the lower cartridge half 4 by set screws 9.

The lower cartridge half 4 is made up of a lower cartridge half main body portion 4A and a metallic plate 6 unified to this main body portion 4A. The main body portion 4A is formed of, for example, ABS resin, in the shape of a shallow saucer having a rectangular bottom wall section 15 and an outer peripheral wall section 16 formed upright on the outer periphery except a front side 17. The main body portion 4A has, in its bottom wall section 15, a bottom aperture 49 except the center front portion, rear portion and backside corner portions making up a loading reference area for the video tape recorder, as later explained. The main body portion 4A is unified to a base plate 6 by insert-molding, also as later explained.

Figure 6:
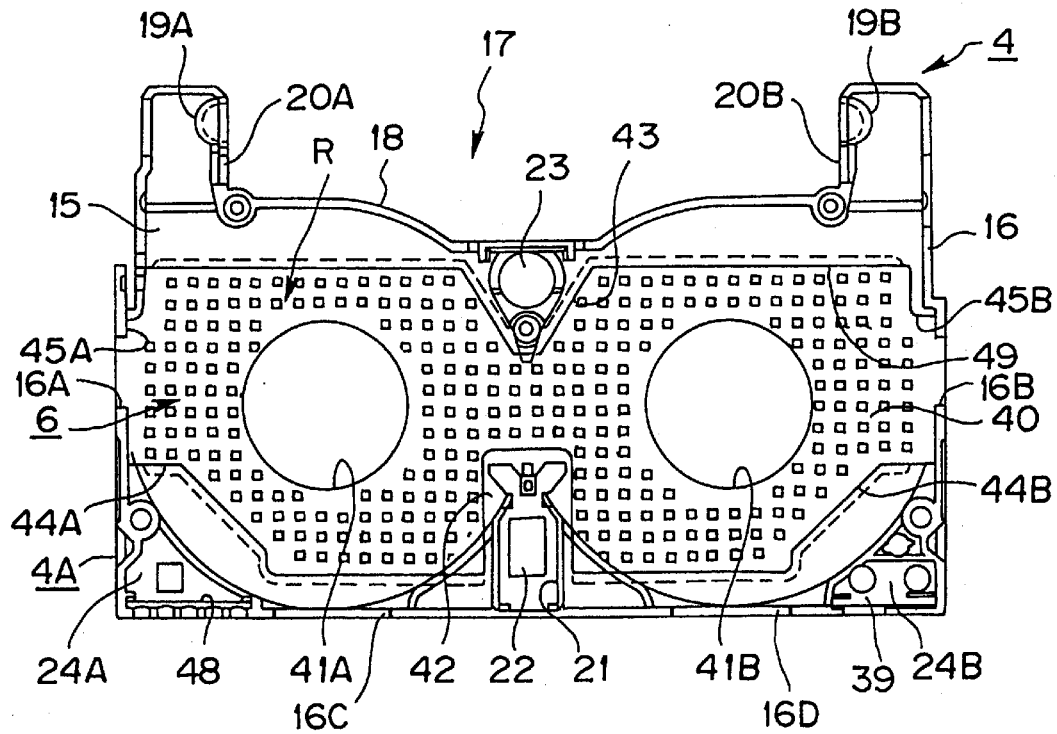
FIG. 6 is a plan view showing a lower cartridge half constituting a main cartridge body portion of the tape cartridge shown in FIG. 1.

On the inner surface of the bottom wall section 15 of the main body portion 4A is set upright a guide wall section 18 inwardly of the opened front surface section 17, as shown in FIG. 6. The guide wall section 18 is arcuately bent from a mid portion towards both sides and constitutes a portion of a reel guide wall section holding the outer peripheral portions of the tape reels 7 in cooperation with the guide wall section 14 of the upper cartridge half 3.

The main body portion 4A has arcuately-shaped upstanding wall sections encircling both backside corners, a reel lock unit 21 and an end detector 23, as later explained. These upstanding wall sections and the above-mentioned guide wall section 18 delimit a tape reel rotation area R within which are rotatably housed the tape reels 7 described above. The bottom aperture 49 is formed within this tape reel rotation area R.

Figure 7:
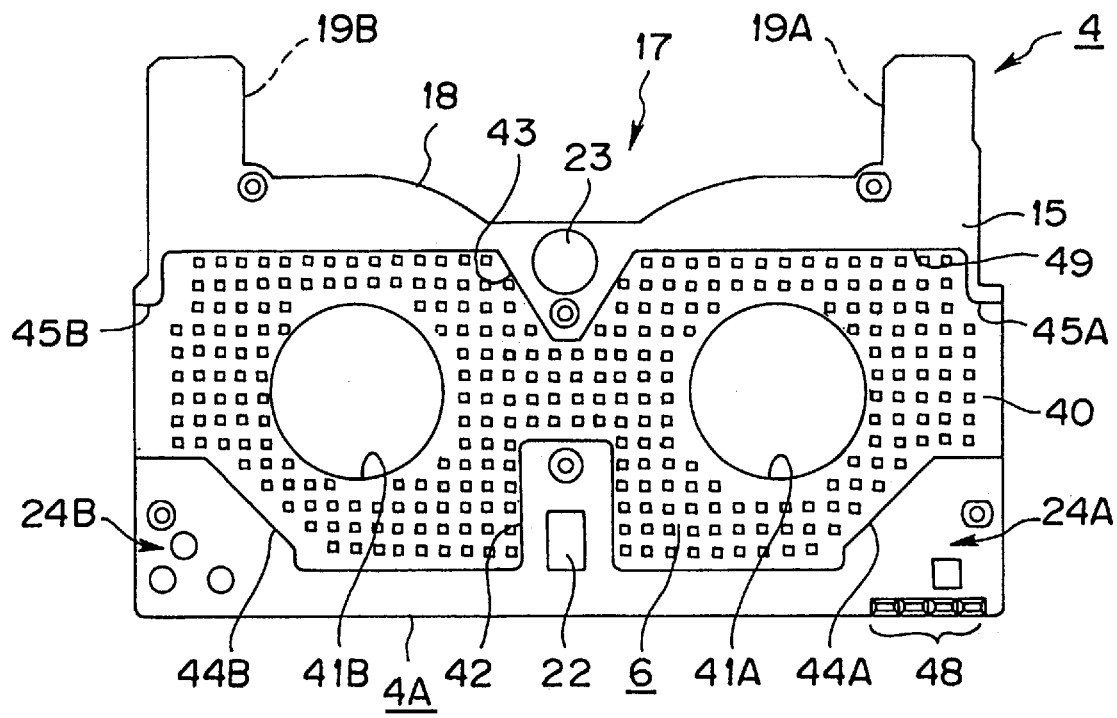
FIG. 7 is a bottom plan view showing the lower cartridge half shown in FIG. 6.

Both side portions of the opened front side 17 of the main body portion 4A are extended towards the front side, as shown in FIGS. 6 and 7. On these side portions are formed tape guide sections 19 (19A, 19B) facing each other. These tape guide sections 19 have arcuately-shaped outer lateral sides engaged by the magnetic tape 8 pulled out from the tape reels 7 as later explained. On the inner sides of the tape guide sections 19 are formed lid guide grooves 20 (20A, 20B) configured for rotatably and vertically movably supporting the front lid 25 constituting the lid structure 5 as will be explained subsequently.

At a mid portion on the back side of the bottom wall section 15 of the main body portion 4A is integrally formed the reel lock unit 21, as shown in FIG. 6. the reel lock unit 21 is comprised of a pair of guide wall sections extending parallel to each other in the fore-and-aft direction and houses a reel lock member 37 and a rel spring 38 biasing the reel lock member 37 forwards. The reel lock unit 21 has a reel lock guide groove 22 passed through the bottom wall section 15. When the tape cartridge 1 is loaded on the video tape recorder, a reel unlock member of the video tape recorder is intruded into the reel lock guide groove 22. Stated differently, the reel lock member 21 forms a part of the loading reference for loading the tape recorder 1 on the vide tape recorder.

At a mid portion on the front side of the bottom wall section 15 of the lower cartridge half main body portion 4A, in register with the reel lock guide section 21, there is formed an end detector 23, as shown in FIGS. 6 and 7. The end detector 23 is made up of a light source entrance aperture passing through the bottom wall section 15 and a tubular boss formed around the light source entrance aperture. When the tape cartridge 1 is loaded on the video tape recorder, the light source of an end detection mechanism of the video tape recorder is intruded via light source entrance aperture into the inside of the main cartridge body portion 2. Thus the end detector 23 also constitutes a part of the loading reference used in loading the tape cartridge 1 on the video tape recorder.

The light radiated from the light source is led laterally from both side of the tubular boss along the inner surface of the guide wall section 18. The light is then passed through the running path of the magnetic tape 8 running between the outer peripheral wall section 16 and the tape guide 19 to outside so as to be detected by a light receiving element of the end detection mechanism.

On both backside corners of the lower cartridge half main body portion 4A are mounted design statement detectors 24 (24A, 24B), as shown in FIGS. 6 and 7. These design statement detectors 24 are comprised of a plurality of detection holes opened depending on the type or length of the magnetic tape 8 or the recording density thereof. Although not shown in detail, these detection holes are formed in the main body portion 4A by rupturing plural thin-walled portions previously formed at patterned positions.

When the tape cartridge 1 is loaded on the tape recorder, a detection member, not shown, constituting a design statement detection mechanism of the video tape recorder detects the presence or absence of the detection holes in the design statement detector 24 for detecting the design statements. Therefore, the design statement detector 24 also constitute part of the loading reference used in loading the tape cartridge 1 on the tape recorder.

On a corner of the lower cartridge half main body portion 4A is mounted a storage unit 48, as shown in FIG. 7. Although not shown in detail, this storage unit 48 is made up of storage element for storage of the use state of the tape cartridge 1 or the control information, and an input/output terminal. The input/output terminal is mounted facing the outer peripheral wall section 16 on the back side of the main body portion 4A. When the tape cartridge 1 is loaded on the video tape recorder, a connector of an information recording/reproducing mechanism, not shown, is connected to the input/output terminal of the storage unit 48. The information recorded by the information recording/reproducing mechanism on the storage element is reproduced from the tape cartridge 1, or the pre-set information is recorded thereon.

On the opposite side corner of the lower cartridge half main body portion 4A is mounted a mistaken recording inhibiting member 39, as shown in FIG. 6. This mistaken recording inhibiting member 39 is switched between two positions, that is a position of opening a mistaken recording detection opening and a position of closing the opening. When the mistaken recording inhibiting member 39 is set to the first position of closing the mistaken recording detection opening, a detection member of the mistaken recording detection mechanism provided on the tape recorder is prohibited by this mistaken recording inhibiting member 39 from entering the mistaken recording detection opening to enable recording of the information signals on the magnetic tape 8.

When the mistaken recording inhibiting member 39 is set to the second position of opening the mistaken recording detection opening, the detection member of the mistaken recording detection mechanism provided on the tape recorder is intruded into the mistaken recording detection opening to disable recording of the information signals on the magnetic tape 8. Thus the mistaken recording detection opening also constitutes part of the loading reference used in loading the tape cartridge 1 on the video tape recorder.

Figure 8:
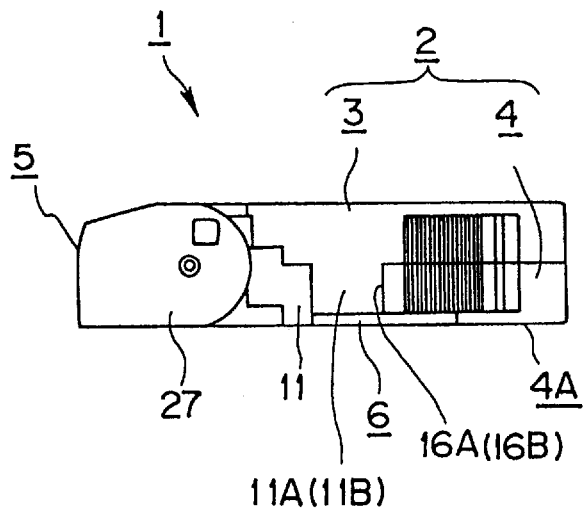
FIG. 8 is a right side view showing the tape cartridge of FIG. 1.

In the outer peripheral wall section 16 of the lower cartridge half main body portion 4A are formed substantially rectangular cut-outs 16A, 16B in register with protuberant edges 45 of the base late 6, as later explained, as shown in FIGS. 6 and 8.

On the outer peripheral wall section 16 on the rear side of the lower cartridge half main body portion 4A is formed a substantially rectangular cut-out 16C between the corner where the storage unit 48 is provided and the reel lock unit 21 where the reel lock member 37 is provided, while a substantially rectangular cut-out 16D is formed between the opposite side corner where the mistaken recording inhibiting member 39 is provided and the reel lock member 21.

Figure 9:
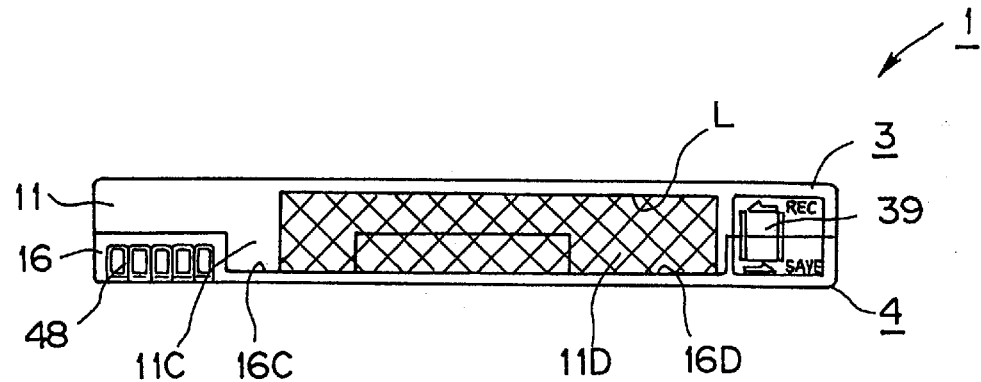
FIG. 9 is a back side view showing the tape cartridge of FIG. 1.
Figure 10:
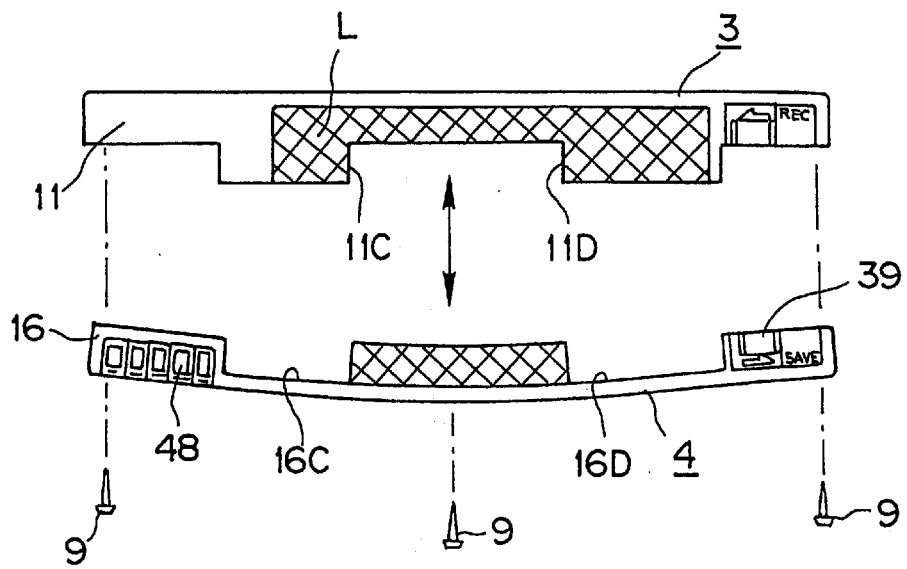
FIG. 10 is a back side view showing the state in which a lower cartridge half and an upper cartridge half making up a main cartridge body portion are assembled together.

In the outer peripheral wall section 16 of the lower cartridge half main body portion 4A is formed a recessed label area L in which to bond a display label for displaying recording contents, as shown by double shading lines in FIG. 9. The cut-outs 16C, 16D are of cut-out depth along the boundary line of the label area L in the man body portion 4A.

On the outer peripheral wall section 11 on the lateral surface of the upper cartridge half 3 are protuberantly formed substantially rectangular fitting lugs 11A, 11B in register with the cut-outs 16A, 16B in the lower cartridge half main body portion 4A, as shown in FIGS. 4, 8 and 9. On the outer peripheral wall section 11 of the upper cartridge half 3 are protuberantly formed substantially rectangular fitting lugs 11C, 11D in register with the cut-outs 16C, 16D in the lower cartridge half main body portion 4A.

The lower cartridge half main body portion 4A is formed with a plurality of studs on the bottom surface section 15 in register with the studs of the upper cartridge half 3. Thus, if, after various components of the upper cartridge half 3 and the lower cartridge half 4 are assembled together, the outer peripheral wall sections 11, 16 are abutted to each other, the fitting lugs 16A, 16B are fitted into the cut-outs 11A, 11B, respectively, while the fitting lugs 16C, 16D are fitted into the cut-outs 11C, 11D, respectively.

Figure 5:
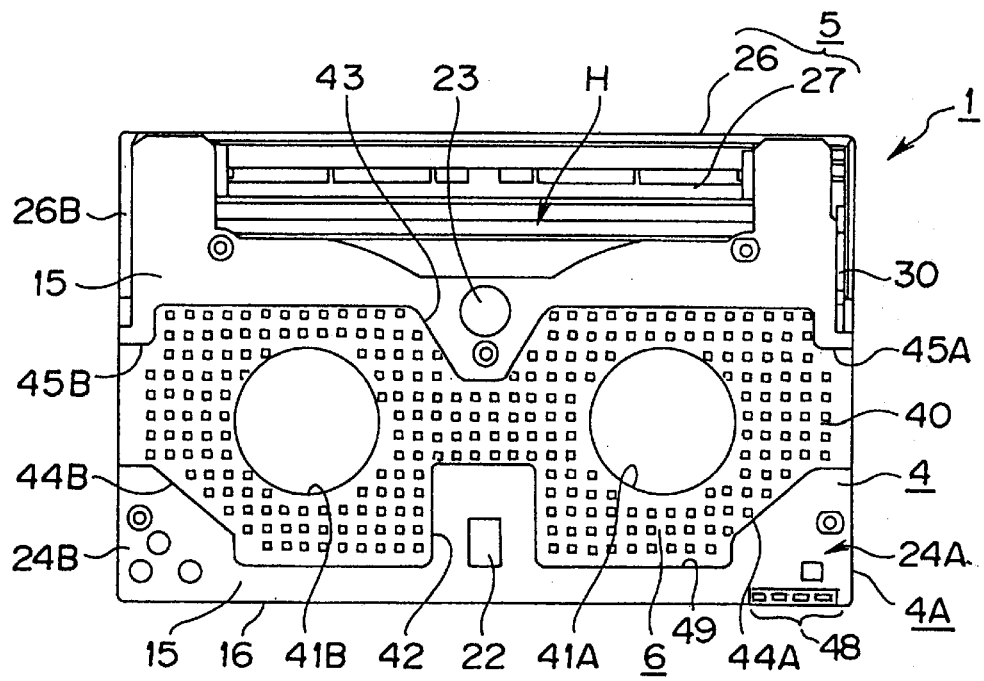
FIG. 5 is a bottom view showing the tape cartridge of FIG. 1.

After the outer peripheral wall sections 11, 16 are abutted to each other, the upper cartridge half 3 and the lower cartridge half 4 are assembled together by the set screws 9 applied from the bottom side for completing the main cartridge body portion 2, as shown in FIG. 9. With the main cartridge body portion 2, the opened front side 13 of the upper cartridge half 3 and the opened front side 17 of the lower cartridge half 4 cooperate for defining a loading spacing H, as shown in FIG. 5.

By forming the cut-outs 16A to 16D as described above, it becomes possible to decrease warping otherwise produced due to thermal contraction on insert-molding the base plate 6. If small warping is produced, such small warping may be easily and reliably corrected by assembling the lower cartridge half 4 to the upper cartridge half 3 and by connecting them together by the set screws 9.

Moreover, since display labels are affixed to the portions of the main cartridge body portion 2 where the fitting lugs 11C, 11D on the outer peripheral wall section 11 of the upper cartridge half 3 are assembled to the cut-outs 16C, 16D in the outer peripheral wall section 16 of the lower cartridge half 4, there is no risk of the tape cartridge being impaired in appearance by the fitting lugs 11C, 11D being fitted to the cut-outs 16C 16D, respectively.

If the cut-outs in the outer peripheral wall section 16 of the lower cartridge half 4 are increased in area, the force of tension produced in the longitudinal direction of the outer peripheral wall section 16 is fractionated and becomes smaller thus further suppressing warping otherwise produced by thermal contraction in the lower cartridge half main body portion 4A. Thus, although plural cut-outs 16A to 16D are formed in the above-described embodiment of the lower cartridge half main body portion 4A, it is also possible to provide a continuous cut-out extending between both side corners.

The lid structure 5 is made up of a front lid 25, a back lid 28, a lid spring 29 and a lid cam 30. The front lid 25 is made up of a major surface section 26 having a shape and size sufficient to close the loading spacing H formed in the front side of the cartridge main body portion 2 and lateral side sections 27A, 27B having pivots engaged in shaft apertures formed in the lateral surfaces of the cartridge main body portion 2. The front lid 25 is substantially U-shaped and elongated in shape in the horizontal direction.

The front lid 25 has its major surface section 26 positioned ahead of the tape guide 19 while having the lateral side sections 27 rotatably supported by the main cartridge body portion 2. The front lid 25 is biased in a direction of closing the loading spacing H of the main cartridge body portion 2 under the spring force of the lid spring 29 comprised of a torsion spring mounted on a supporting shaft.

The back lid 28, substantially U-shaped in cross-section, has an outer shape and size to close the opened front side of the main cartridge body portion 2 and the opened front side 13 of the upper cartridge half 3. The back lid 28 is positioned inwardly of the major surface section 26 of the front lid 25 and rotatably supported by this front lid 25. The back lid 28 has cam protrusions formed integrally on both lateral edges thereof for engaging with the lid guide 20. The back lid 28 is mounted on the main cartridge body portion 2 for facing to and at some distance from the major surface section 26 of the front lid 25 for defining a spacing within which extends the magnetic tape 8 as later explained.

The lid cam 30 is rotatably mounted on a cam mounting portion formed integrally with the outer peripheral wall section of the lower cartridge half 4. Although not shown, the lid cam has its one end engaged with a cam formed on the inner surface of the distal end of a lateral surface 27A of the front lid 25, while having its other end facing a lid opening groove formed in the lower cartridge half main body portion 4A.

The above-described lid structure 5 usually closes the front side of the main cartridge body portion 2 under the spring force of the lid spring 29, as shown in FIGS. 3, 5 and 8. When the main cartridge body portion 2 is loaded on the video tape recorder, the lid cam 30 of the lid structure 5 is rotated by a lid opening member provided on the video tape recorder.

By this operation of the lid cam 30, the front lid 25 of the lid structure 5 is rotated against the spring force of the lid spring 29 for opening the front side of the main cartridge body portion 2 against the spring force of the lid spring 29 for opening the front side of the main cartridge body portion 2. By this operation of the front lid 25, the back lid 28 of the lid structure 5 is turned in unison therewith along the lid guide 20. By such rotation of the lid structure 5, the loading spacing H formed on the front side of the main cartridge body portion 2 of the tape cartridge 1 is opened.

The left-side and right-side tape reels 7 are thrust towards the lower cartridge half 4 by a pair of reel springs 31 (31A, 31B) mounted on the inner surface of the upper cartridge half 3, as shown in FIG. 4. The tape reels are prohibited from performing idle movement in the up-and-down direction within the interior of the main cartridge body portion 2.

The tape reels 7 are made up of tubular hubs 32 (32A, 32B) on the outer periphery of which the magnetic tape 8 is wound, clampers 33 (33A, 33B) for securing one end of the magnetic tape 8 to the hubs 32, lower flanges 34 (34A, 34B) formed as one with the hubs 32 and upper flanges 35 (35A, 35B) facing the lower flanges 34 and mounted on the hubs 32.

The hubs 32 are formed with hub openings engaged by reel driving shafts on the video tape recorder, and are designed to face reel bearing holes 41 formed in the base plate 6 as later explained. The hubs 32 are formed on the outer peripheral sides thereof with engagement grooves engaged by the dampers 33, by means of which a clamping tape 36 connected to an end of the magnetic tape is clamped and secured.

The entire outer periphery of the lower flange 34 is formed with peripheral teeth. The tape reel 7 is usually housed within the above-mentioned reel lock unit 21, and is prohibited from performing rotational idle movements by the reel lock member 37 engaged with the outer peripheral teeth of the lower flange 34. When the tape cartridge 1 is loaded on the video tape recorder, the reel lock member of the tape reel is moved by the reel unlock member entering the reel lock guide groove 22, against the spring force of the reel lock spring 38, so as to be released from the retained state and becomes free to be rotated.

The clamping tape 36 is a transparent tape and transmits the light radiated from the light source of the video tape recorder inserted into the end detector 23. Of course, the magnetic tape 8 is opaque due to the presence of the recording layer and hence interrupts the light radiated from the light source of the end detection mechanism. Thus, with the tape cartridge 1, the tape end is detected by the presence or absence of light transmitted through the clamping tape 36 and leaking out at the lateral side of the main cartridge body portion 2.

The magnetic tape 8 is pulled out forwards at the outer periphery of the tape reel 7A so as to be engaged with the tape guide 19A and so as to be folded back towards the tape loading spacing H. When traversing the spacing defined between the tape loading spacing H, the magnetic tape 8 is extended in a spacing delimited between the front lid 25 and the back lid 28 of the lid structure 5 and thereby protected against contamination or damage.

When the tape cartridge 1 is loaded on the tape recorder, the lid structure 5 is rotated as described above to open the tape loading spacing H, as explained previously. Thus the magnetic tape 8 is exposed to outside at a position ahead of the main cartridge body-portion 2. The magnetic tape 8 is pulled out from the tape reels unlocked by the tape loading member intruded into the tape loading spacing H by way of loading.

The base plate 6 performs the role of imparting a pre-set weight to the tape cartridge 1 and to maintain mechanical toughness against torsion or warping, and is formed by punching an aluminum or aluminum alloy plate. The base plate 6 has its main portion 40 sized so as to be substantially equal to the size of the lower cartridge half main body portion 4A in the longitudinal direction and has its width slightly smaller than the diameter R of the tape reel rotation area R, while being designed to be elongated in the horizontal direction, as shown in FIGS. 5 through 7.

The main portion 40 of the base plate 6 is formed with longitudinally spaced apart reel bearing holes 41 (41A, 41B). These reel bearing holes 41 expose to outside the hub holes formed in the tape reels 7 housed within the main cartridge body portion 2 as described above. Thus, when the tape cartridge 1 is loaded on the tape recorder, the tape driving shafts, engaged in the hub holes for rotationally driving the tape reels 7, are intruded into these reel bearing holes 41.

In the base plate 6, a reel lock clearance 42 and an end detection clearance 43 are formed in register with the reel lock unit 21 and the end detector 23, respectively, intermediate between the reel bearing holes 41 and beginning from both ends along the width of the main portion 40 of the base plate 6. In the base plate 6, design statement detection clearances 44 (44A,. 44B) are formed in register with the design statement detectors 24 at both corners on one side of the main portion 40. The base plate 6 is formed at both longitudinal ends of the main portion 40 with protuberant edges 45 (45A, 45B).

With the base plate 6 insert-molded on the bottom side aperture 49, the outer peripheral portion of the protuberant edge is exposed at the outer peripheral wall section 16 of the lower cartridge half main body portion 4A so as to be flush with the peripheral wall section 16.

The base plate 6, described above, is inserted into a cavity corresponding to the bottom aperture 49 in the molding metal mold, not shown, used for molding the lower cartridge half 4. The resin material held in the molten state in the cavity is injected into the mold for unifying the base plate 6 to the bottom wall section 15 of the lower cartridge half main body portion 4A for molding the lower cartridge half 4. After lapse of pre-set cooling time, the molding metal mold is opened for ejecting the molded lower cartridge half 4.

When the above-described tape cartridge 1 is loaded on the video tape recorder with the outer periphery and the bottom surface section of the main cartridge portion as reference surfaces, the lid structure 5 is rotated by the lid opening member on the video tape recorder for opening the front side loading spacing H. The reel lock member is moved by the reel unlock member intruded via reel lock guide groove 14, against the spring force of the reel lock spring 38, for unlocking the tape reels 7 of the tape cartridge 1. The magnetic tape 8 is pulled out by the loading mechanism on the video tape recorder intruded via the loading spacing H for constructing the pre-set tape running path by way of loading.

The reel driving shafts are intruded into the reel bearings 41 for being engaged with the reel shaft holes in the tape reels 7 in the tape cartridge 1. The reel driving shafts of the tape cartridge 1 are rotated by tape driving operations for recording or reproduction for running the tape reels 7 into rotation for reeling out or taking up the magnetic tape 8. Also the detection holes of the design statement detector 31 of the tape cartridge 1 are detected by a detection mechanism for reading out the information recorded in the storage unit 48.

With the above-described embodiment of the tape cartridge 1, since the cut-outs 16A, 16B are formed in the outer peripheral wall sections 16 of the lateral sides of the lower cartridge half main body portion 4A, while the cut-outs 16C, 16D are formed in the backside outer peripheral wall section 16, the differential thermal contraction between the portion of the outer peripheral wall section 16 neighboring to the base plate 6 and the portion of the outer peripheral wall section 16 remote from the base plate 6 is significantly reduced, while the force of tension produced over the outer peripheral wall section is fractionated, resulting in suppression of the warping produced in the longitudinal direction of the lower cartridge half main body portion due to thermal contraction of the lower cartridge half 4 following injection molding and in consequent suppression of the warping in the lower cartridge half 4 in its entirety.

The tape cartridge of the present invention is not limited to the above-described tape cartridge 1, but may also be applied to a standard video tape cartridge or other types of tape cartridges. The tape cartridge 1 is applicable to a cleaning tape cartridge having housed therein a cleaning taper in place of the magnetic tape, with the main cartridge body portion 2 being common to the cleaning tape cartridge and to the tape cartridge 1. Moreover, the tape cartridge is not limited to that for a video tape recorder, but may also be applied with advantage to a tape cartridge designed for use with various equipments, such as a data cartridge for a computer.

What is claimed is:

1. A tape cartridge having a main cartridge body portion made up of an upper cartridge half and a lower cartridge half, a pair of tape reels rotatably mounted within said main cartridge body portion and on which is wound a tape-shaped recording medium, and a metallic plate insert-molded on said lower cartridge half, wherein the improvement resides in that a plurality of mounting areas in which to mount functional members are formed adjacent to an outer peripheral wall section formed upright on the lower cartridge half and in that a cut-out having a cut-out depth coincident with a boundary line of a bonding area for a display label is provided adjacent to a corner and between these mounting areas, said display label being bonded to the backside of the main cartridge body portion.

2. A tape cartridge having a main cartridge body portion made up of an upper cartridge half and a lower cartridge half, a pair of tape reels rotatably mounted within said main cartridge body portion and on which is wound a tape-shaped recording medium, and a metallic plate insert-molded on said lower cartridge half, wherein the improvement resides in that said metal plate is insert-molded so that its lateral edge is exposed at a lateral surface of the cartridge main body portion, and in that a cut-out in register at least with a lateral edge of the metal plate is formed on the outer peripheral wall section formed upright on the lower cartridge half.

3. A tape cartridge having a main cartridge body portion made up of an upper cartridge half and a lower cartridge half, a pair of tape reels rotatably mounted within said main cartridge body portion and on which is wound a tape-shaped recording medium, and a metallic plate insert-molded on said lower cartridge half, wherein the improvement resides in that said metal plate is insert-molded so that its lateral edge is exposed at a lateral surface of the cartridge main body portion, a plurality of mounting areas in which to mount functional members are formed adjacent to an outer peripheral wall section formed upright on the lower cartridge half, a cut-out having a cut-out depth coincident with a boundary line of a bonding area for a display label is provided between said mounting areas, said display label being bonded to the backside of the main cartridge body portion, and in that a cut-out in register at least with a lateral edge of the metal plate is formed on the outer peripheral wall section formed upright on the lower cartridge half.

* * * * *